United States Patent
Cheng et al.

(10) Patent No.: US 7,558,312 B2
(45) Date of Patent: Jul. 7, 2009

(54) PARALLEL CORRELATOR IMPLEMENTATION USING BLOCK INTEGRATION FOR SPREAD-SPECTRUM COMMUNICATION

(75) Inventors: MingQiang Cheng, Chengdu (CN); ShiJie Li, Chengdu (CN); Bo Yu, Chengdu (CN)

(73) Assignee: O2Micro International Ltd., Georgetown (KY)

( * ) Notice: Subject to any disclaimer, the term of this patent is extended or adjusted under 35 U.S.C. 154(b) by 623 days.

(21) Appl. No.: 11/172,443

(22) Filed: Jun. 30, 2005

(65) Prior Publication Data

US 2007/0002933 A1   Jan. 4, 2007

(51) Int. Cl.
*H04B 1/00* (2006.01)

(52) U.S. Cl. .................................. 375/142; 375/150

(58) Field of Classification Search ............... 375/142, 375/145, 149, 150, 340, 326, 343; 342/357.08, 342/357.12, 357.15
See application file for complete search history.

(56) References Cited

U.S. PATENT DOCUMENTS

| | | | | |
|---|---|---|---|---|
| 5,414,729 A | * | 5/1995 | Fenton | 375/149 |
| 5,982,811 A | * | 11/1999 | Harrison et al. | 375/150 |
| 6,633,255 B2 | * | 10/2003 | Krasner | 342/357.12 |
| 6,788,735 B2 | * | 9/2004 | Kohli et al. | 375/150 |

* cited by examiner

Primary Examiner—Khanh C Tran
(74) Attorney, Agent, or Firm—Wang Law Firm, Inc.; Li K. Wang

(57) ABSTRACT

An apparatus for processing spread spectrum signals digitized at a predetermined sampling frequency. The apparatus includes an intermediate frequency signal preprocessing unit, a plurality of parallel block integrators. The intermediate frequency signal preprocessing unit is capable of generating pre-integration results based on an input signal and local reference signals at a predetermined rate. The pre-integration results produced by the intermediate frequency signal preprocessing unit are grouped into sets of pre-integration results. Each set of the pre-integration results contains a predetermined number of pre-integration results. The plurality of parallel block integrators is in communication with the intermediate frequency signal preprocessing unit. Each of the block integrators is capable of receiving, in succession, sets of a predetermined number of pre-integration results, and for each set of predetermined number of pre-integration results, each of the block integrators is capable of performing a plurality of partial correlations based on the set of the predetermined number of pre-integration results and a plurality of shifted segments of a pseudorandom noise code until a next set of pre-integration results are received by the block integrator.

41 Claims, 5 Drawing Sheets

PARALLEL CORRELATOR IMPLEMENTATION USING BLOCK INTEGRATION FOR SPREAD-SPECTRUM COMMUNICATION

FIELD OF THE INVENTION

The invention relates to spread spectrum digital receiver, and more particularly, to parallel correlator implementation in global positioning system (GPS) receiver.

BACKGROUND OF THE INVENTION

Spread spectrum communication is advantageous in communication applications requiring high reliability in a noisy environment. According to Shannon's theory, a widened spectrum can lower the requirement for a high signal-to-noise ratio, which indicates that a weak signal can be transmitted and detected by using the spread spectrum communication technology. In order to spread the spectrum, a high-speed pseudorandom noise (PRN) code is often used to modulate a narrow-band signal to generate a wide-band signal. To communicate data, the wide-band signal is modulated by a message data stream. The message data rate is usually much lower than the PRN code symbol or "chip" rate, and the data and code-chip signal edges are usually synchronized.

Message data from a spread spectrum signal, such as a GPS signal, can be retrieved by first converting the received signal down to a lower frequency by multiplying it with a locally generated carrier signal. The local carrier signal may be generated by a properly tuned local oscillator. If the frequency and phase of the local carrier signal are the same as those of a received original narrow-band carrier, then the multiplier output signal from multiplication of the received signal and the local carrier signal will be a bipolar wide-band data stream. This bipolar wide-band data stream is the product of the bipolar PRN code and message data sequences. The PRN code is then removed by multiplying the wide-band data stream with a locally generated PRN code that is time aligned with the received PRN code. Thus, the message data can be obtained. The above-mentioned process is a signal despread process.

GPS signals are spread spectrum signals broadcasted by the GPS satellites on L1, L2, and L5 frequencies. Current commercial GPS receivers generally use the L1 frequency (1575.42 MHz). There are several signals broadcasted on the L1 carrier: coarse/acquisition(C/A) code, P code and the navigation data. The detailed information of the satellite orbit is contained in the navigation data. The C/A code is mainly used by civilian receivers for positioning purposes. The C/A code is used to determine a pseudo-range (the apparent distance to the satellite), which is then used by the GPS receiver to determine a position. The C/A code is a type of the pseudorandom noise (PRN) code, the functionality of which has been previously described. A radio frequency signal coded by the C/A code becomes a spread spectrum signal. Each satellite has a unique C/A code and repeats the C/A code over and over again. The C/A code is a sequence of zeros and ones (binary). Each zero or one is known as a "chip". The C/A code is 1023 chips long, and it is broadcasted at 1.023 Mega-chips per second, i.e., the repetition of the C/A code lasts 1 millisecond. It is also possible to regard each chip as having two states: +1 and −1.

A set of data collected by a GPS receiver usually contains signals from several satellites. Signals travel from different satellites through different channels. Usually, the GPS receiver simultaneously processes the signals from several channels. Each signal has a different C/A code with a different starting time and different Doppler frequency shift. Therefore, to find the signal of a certain satellite, GPS receivers traditionally conduct a two dimensional search, checking each C/A code with different starting time at every possible frequency. "Different starting time," as used herein, can be interpreted as the result of the phase delay of a C/A code. In a GPS receiver, an acquisition method is employed to find the beginning of the C/A code and carrier frequency, in particular, the Doppler frequency shift of the signal. To test for the presence of a signal at a particular frequency and C/A code delay, the GPS receiver is tuned to the frequency, and the incoming signal is correlated with a known PRN code delayed by an amount corresponding to the time of arrival. If no signal is detected, the search continues for the C/A code with a next possible delay. Traditionally, each possible delay of the C/A code is obtained by shifting the C/A code by half a chip. Since a C/A code comprises 1023 chips, 2046 delay possibilities may need to be checked for a fixed frequency. After all delay possibilities are checked, the search continues to a next possible frequency. Because thousands of frequencies and code delays may need to be checked, the speed of the acquisition process is highly important.

FIG. 1 illustrates a prior art block diagram of a GPS receiver 100. In general, a GPS receiver includes two parts: RF (radio frequency) front end module 101 and base-band signal processing module 103. The GPS signals transmitted from the GPS satellites are received from an antenna 102. Through a RF tuner 104 and a frequency synthesizer 105, a received signal (also known as input signal) is converted from the GPS signal (a radio frequency signal) to a signal with a desired output frequency. Then, an analog-to-digital converter (ADC) 106 digitizes the converted signal at a predetermined sampling frequency. The converted and digitized signal is known as intermediate frequency (IF) signal. The IF signal is then sent to the base-band signal processing module 103, which includes several signal processing stages. The IF signal is sent to an acquisition module 110 where Doppler frequency shift search and C/A code phase shift search are conducted, as described above. During the acquisition stage, the integration of the IF signal is completed by performing correlation based on the IF signal and C/A code. A tracking module 112 is capable of tracking the GPS signal through IF signal by using a carrier tracking loop and a code tracking loop, thus, obtaining the navigation data contained in the GPS signal. Then, a navigation data calculation module 114 and a position calculation module 116 may utilize the navigation data to calculate the user's position.

To achieve a better performance, parallel correlators are conventionally employed to conduct parallel searches. However, using a large number of the parallel correlators demands large logic resources and requires high correlation frequency thereby making it hard for the acquisition process to realize in an Application Specific Integrated Circuit (ASIC) if no optimization design is adopted. Thus, it is to an improved acquisition module that enables parallel correlation the present invention is primarily directed.

SUMMARY OF THE INVENTION

The present invention advantageously provides a method and apparatus using the IF signal preprocessing technique and the block integration technique to realize equivalent parallel correlators. As a result, the goal of lower correlation frequency, fewer gate counts, and reduced power consumption can be achieved in the acquisition stage of a spread spectrum receiver.

There is provided a method for processing spread spectrum signals in a circuit with a plurality of block integrators, wherein the circuit utilizes an input signal digitized at a predetermined sampling frequency, a local reference signal and a pseudorandom noise code. The method includes a) generating pre-integration results based upon the input signal and the local reference signal at a predetermined rate, b) sending a set of predetermined number of the pre-integration results to each block integrator, c) receiving at each block integrator the pseudorandom noise code with a respective code phase, d) performing at each block integrator a partial correlation based on the set of the predetermined number of pre-integration results and a segment of the pseudorandom noise code, e) obtaining a partial correlation result in each block integrator from the partial correlation, f) adding the partial correlation result to a previous partial correlation result, and g) shifting the pseudo-random noise code sent to each block integrator by a predetermined position. The method repeats step d) through g) until a next set of predetermined number of pre-integration results are sent to each block integrator. The method further repeats step b) through h) until a plurality of full correlation results have been achieved in each block integrator.

There is also provided an apparatus for processing spread spectrum signals digitized at a predetermined sampling frequency. The apparatus includes an intermediate frequency signal preprocessing unit and a plurality of parallel block integrators in communication with the intermediate frequency signal preprocessing unit. The intermediate frequency signal preprocessing unit is capable of generating pre-integration results based on an input signal and local reference signals at a predetermined rate. Each of the block integrators is capable of receiving, in succession, sets of a predetermined number of pre-integration results, and for each predetermined number of pre-integration results, each of the block integrators is capable of performing a plurality of partial correlations based on the set of predetermined number of pre-integration results and a plurality of shifted segments of a pseudorandom noise code until a next set of predetermined number of pre-integration results are sent to each of the block integrators.

There is also provided a receiver for receiving spread spectrum signals. The receiver includes a tuner, an analog-to-digital converter, an apparatus for processing the spread spectrum signal, and a storage unit. The tuner is capable of converting the received spread spectrum signal from its original frequency to an intermediate frequency. The analog-to-digital converter coupled to the tuner converts the intermediate frequency signal into a digitized input signal at a predetermined sampling frequency. The apparatus for processing the spread spectrum signal is coupled to the analog-to-digital converter. The apparatus includes an intermediate frequency signal preprocessing unit and a plurality of parallel block integrators in communication with the intermediate frequency signal preprocessing unit. The intermediate frequency signal preprocessing unit is capable of generating pre-integration results based on the digitized input signal and a local reference signals at a predetermined rate. Each of the block integrators is capable of receiving, in succession, sets of a predetermined number of pre-integration results, and for each predetermined number of pre-integration results, each of the block integrators is also capable of performing a plurality of partial correlations based on the set of predetermined number of pre-integration results and a plurality of shifted segments of a pseudorandom noise code until a next set of predetermined number of pre-integration results are sent to the block integrator. The apparatus further includes a control logic coupled to the storage unit and the plurality of block integrators. The control logic reads a previous partial correlation result from the storage unit, adds current partial correlation result to the previous partial correlation result, and writes the modified previous partial correlation result back into the storage unit. The storage unit is coupled to the control logic and stores calculation results.

BRIEF DESCRIPTION OF THE DRAWINGS

Features and advantages of embodiments of the invention will become apparent as the following Detailed Description proceeds, and upon reference to the Drawings, where like numerals depict like elements, and in which.

DETAILED DESCRIPTION OF THE INVENTION

Figure 1:
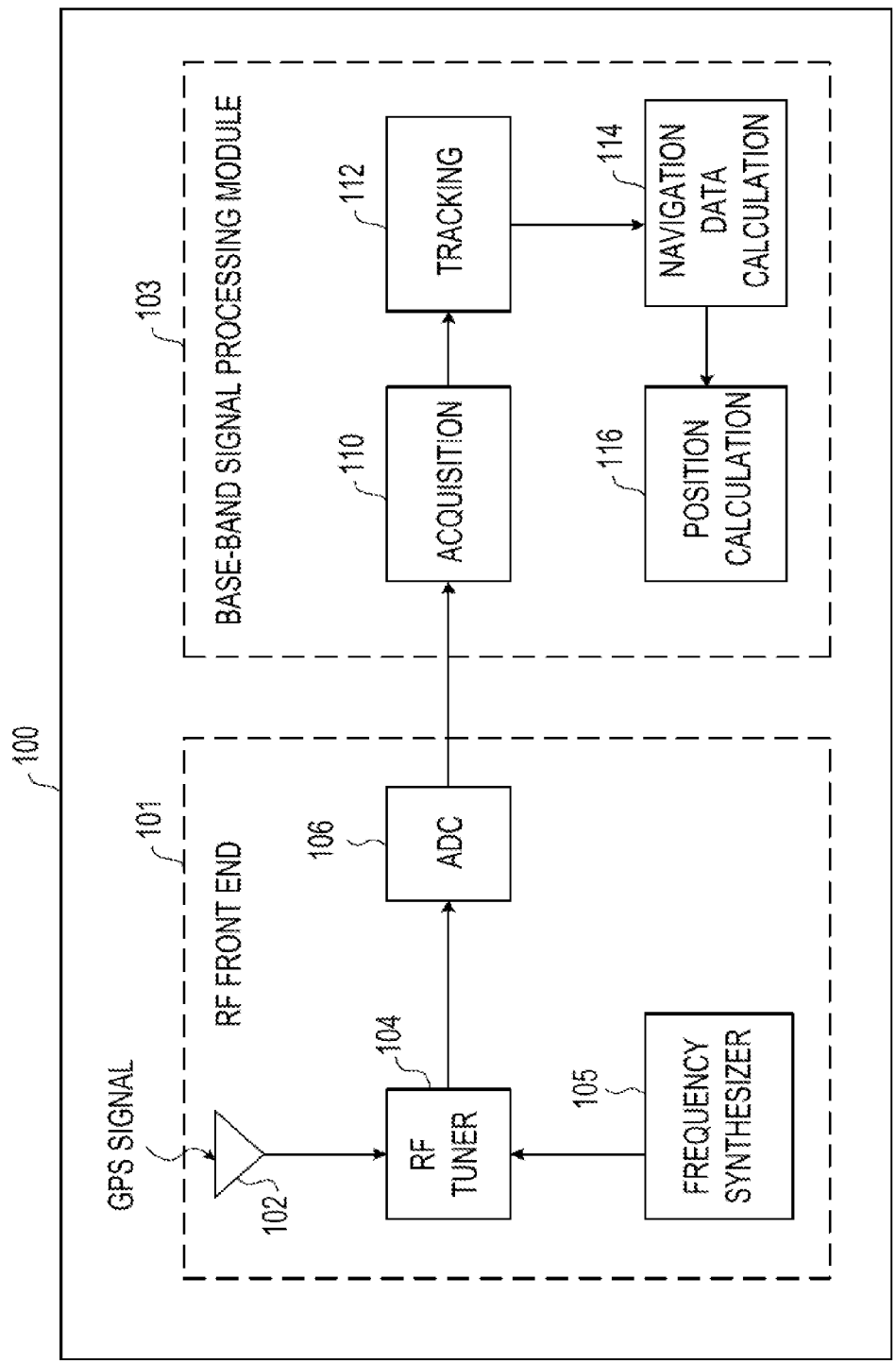
FIG. 1 is a prior art block diagram of a spread spectrum receiver.
Figure 2:
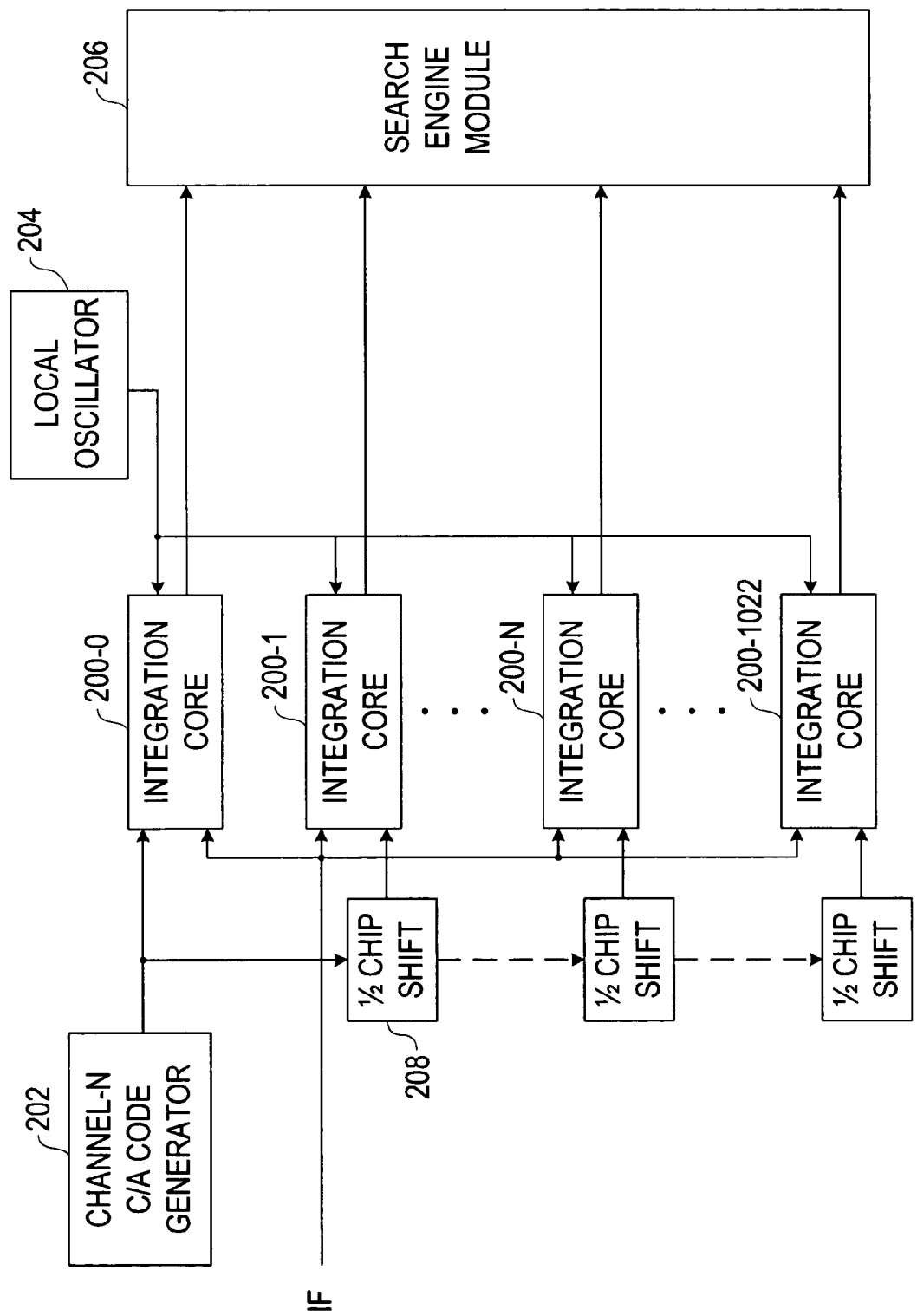
FIG. 2 is architecture of a prior art acquisition module.

FIG. 2 illustrates architecture of a prior art acquisition module for a certain channel. The acquisition module as illustrated in FIG. 2 comprises 1023 parallel integration cores numbered consecutively from integration core 200-0 to integration core 200-1022, a channel-N C/A code generator 202 capable of generating C/A codes, a local oscillator 204 capable of generating carrier signals, and a search engine module 206. Each integration core 200 completes a correlation taking an IF signal, a local carrier signal, and a C/A code as inputs. In the integration core 200-0, the correlation operation consists of multiplying the IF signal with the local carrier signal and C/A code. The correlation result is then sent to the search engine module 206. The search engine module 206 decides whether the correlation result has exceeded a predefined threshold and if the particular Doppler frequency shift and the C/A code phase shift have been found. In order to find the beginning point of the C/A code, a common practice is to shift the C/A code by half a chip for each C/A code search. In the integration core 200-1, a similar correlation is performed except that the C/A code sent to integration core 200-1 is shifted by half a chip. The ½ chip shift module 208 is used to shift the C/A code by half a chip. As previously stated, a full period of a C/A code contains 1023 chips. Therefore, for a certain frequency, 2046 correlations are required to cover the phase search of a full period of the C/A code. FIG. 2 shows 1023 correlation cores which cover half period of the C/A code phase search. Therefore, to cover a full period of the C/A code phase search, the IF signal needs to be acquired twice to complete a full acquisition.

Although parallel correlations provide a relatively high speed of acquisition process, in practice, 1023 parallel integrators are hard to realize in hardware. To achieve an equivalent parallel integration, some prior arts either increase the hardware scale or select a high correlation frequency. The present invention provides an advantageous practice to realize a large number of equivalent parallel integrators with a lower correlation frequency and smaller hardware scale. For simplicity, the disclosure herein is mainly focus on achieving 1023 equivalent parallel integrators or parallel correlators.

However, It will be appreciated by those skilled in the art that any number of parallel integrators can be achieved using the method detailed herein.

Figure 3:
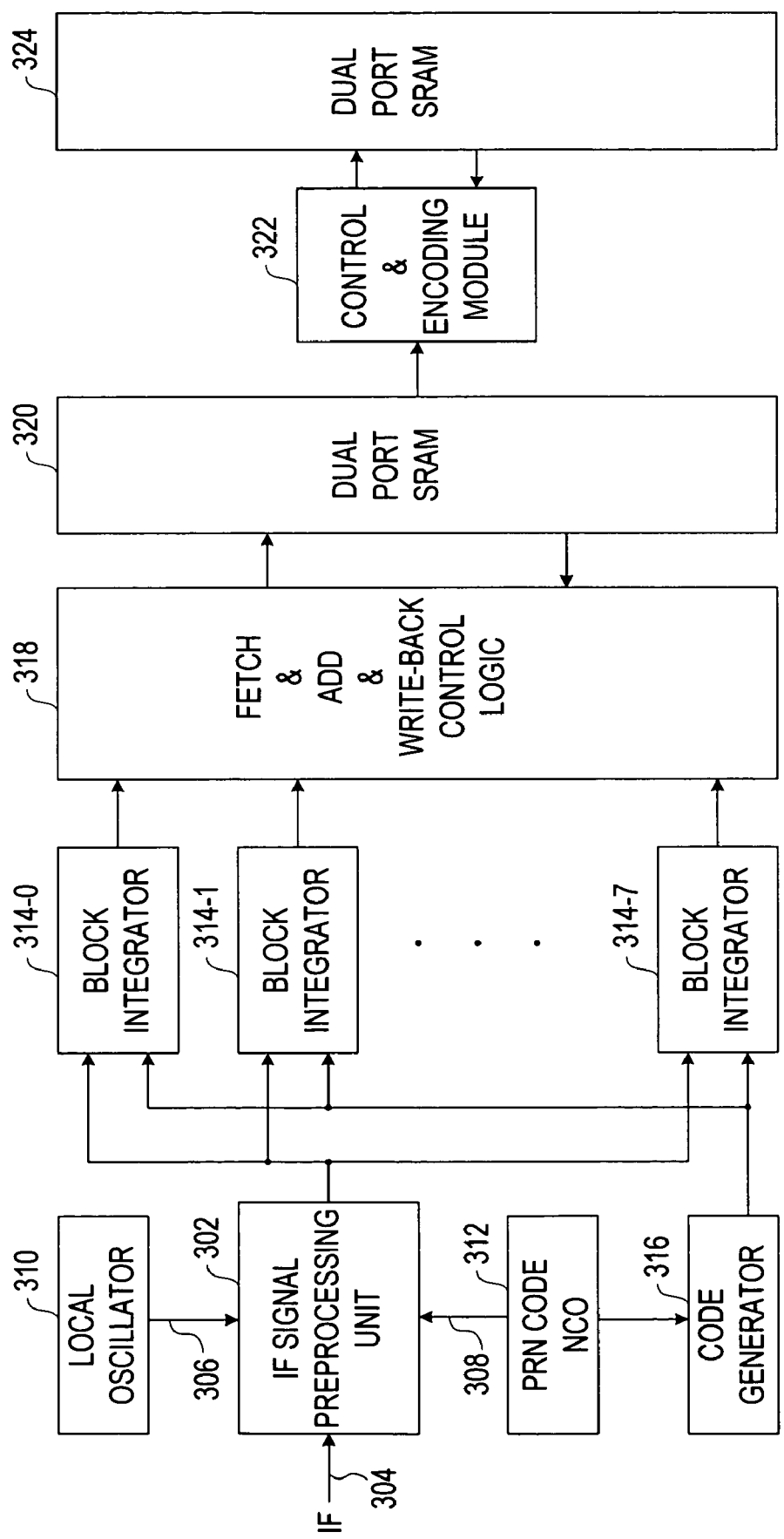
FIG. 3 is an exemplary architecture of an acquisition module according to one embodiment of the invention.

FIG. 3 illustrates an exemplary architecture of an acquisition module according to the invention. An intermediate frequency (IF) signal preprocessing unit 302 receives at least three signals: an input signal (IF signal) 304, a local reference signal (carrier signal) 306 generated by a signal generator (local oscillator) 310, and a clock signal 308 generated by a code clock generator (a PRN code Numerically Controlled Oscillator, also known as PRN code NCO) 312. The IF signal preprocessing unit 302 is used to convert the input IF signal 304 from a sampling rate to a lower rate by pre-integrating the IF signal.

As previously stated, the IF signal is multiplied by both the local carrier signal and PRN code in the acquisition module. Since the C/A code does not change during the time interval of half a code chip, it is desirable to obtain a pre-integration result first by multiplying the IF signal 304 with the local carrier signal 306 within a time interval of half a code chip and then later multiply the pre-integration result with the PRN code. If the sampling frequency of the input IF signal 304 is 16.368 MHz, then the IF signal 304 contains 8 data samples within a data length of half a chip since a cycle of the C/A code is 1 milliseconds. The IF signal preprocessing unit 302 is adapted to multiply the 8 data samples of the IF signal 304 with 8 respective data samples of the carrier signal 306 point by point, and sum up the multiplication products together to produce a pre-integration result. As such, 8-point multiplication is performed at the rate of half a code chip, i.e. the generation frequency of pre-integration results is 2.046 MHz. Since the PRN code NCO 312 generates a C/A code clock at the rate of half a code chip, the PRN code NCO 312 may be employed to control the generation of pre-integration results at a predetermined rate, such as half a code chip rate. Advantageously, the IF signal preprocessing unit 302 is capable of converting the input signal into a lower frequency. When the preprocessed input signal is generated at a lower frequency, there will be enough time for each block integrator to perform a plurality of correlations in a time division manner rather than performing only one correlation described in FIG. 2 and thus it is possible for the plurality of correlations to share the same logic resource, as will be discussed in greater detail in the following description.

The pre-integration results produced by the IF signal preprocessing unit 302 can be grouped into sets of pre-integration results. Each set of the pre-integration Results contains a predetermined number of pre-integration results. The IF signal preprocessing unit 302 sends, at a predetermined interval, sets of a predetermined number of pre-integration results to all of the block integrators [314-0, . . . , 314-7], which are coupled in parallel. For each set of predetermined number of pre-integration results, each block integrator simultaneously receives the set of the predetermined number of the pre-integration results and a plurality of shifted segments of the PRN code generated by the code generator 316 and performs a plurality of partial correlations. Correlation mentioned herein is an operation that produces inner products by multiplying each pre-integration result with each half code chip and summing the multiplication results together. In one embodiment, the IF signal preprocessing unit 302 may send, for instances, 33 pre-integration results per set to the block integrators [314-0, . . . , 314-7]. Before the next set of 33 pre-integration results are ready, each block integrator has a time periods of 33*(the time length of half a chip) to perform a plurality of partial correlations on the 33 pre-integration results received. If each partial correlation operates at the same frequency as the sampling frequency, e.g. 16.368 MHz, each block integrator may complete at least 256 partial correlations within the time periods of 33*(the time length of half a chip). Consequently, four block integrators are enough to perform 1023 correlations. Because each pre-integration result contains two components: an in-phase(I) signal and a quadrature(Q) signal, two sets of block integrators are needed to perform 1023 correlations on the I signal and Q signal, one set for each signal. Therefore, eight block integrators are presented in this embodiment.

Advantageously, the correlation frequency used herein is much lower than the frequency used by a conventional correlation. Of course, a higher correlation frequency may also be used in the present invention. Furthermore, the IF signal preprocessing unit 302 and the parallel block integrators [314-0, . . . , 314-7] may be able to work in a pipeline mode, i.e., the block integrators [314-0, . . . , 314-7] may process the current set of predetermined number of pre-integration results while the IF signal preprocessing unit 302 is generating a next set of predetermined number of pre-integration results.

However, it should be noted that the sampling frequency, the generation frequency of pre-integration results, the correlation frequency, the number of pre-integration results sent to a block integrator each time, and the number of block integrators may be interrelated. Those skilled in the art should readily appreciate that these parameters can be set to different values besides those values discussed herein. For instance, the correlation frequency may be higher than 16.368 MHz, and the generation frequency of pre-integration results may be set as ¼ chip rate. Additionally, the PRN code is not limited to the C/A code, other types of the PRN code may also be used.

A control logic 318, as shown in FIG. 3, may also be included in the acquisition module. The control logic 318 may be used to control the calculation of complete correlation results. After the block integrator 314-0, for example, produced one partial correlation result, the control logic 318 reads a previous partial correlation result from a first storage unit (a Dual Port SRAM) 320 coupled to the control logic 318, adds the current partial correlation result to the previous partial correlation result produced by the same block integrator, and writes the sum back to the first storage unit 320. A complete correlation on a full period of the IF signal 304 may be achieved after sets of predetermined number of the pre-integration results are sent to the block integrator 314-0. In operation, the control logic 318 receives, in parallel, the partial correlation results from the parallel block integrators [314-0, . . . , 314-7] and performs the same operation described above for the block integrator 314-0. The "previous partial correlation result" refers to the correlation result that is based upon a previous set of the predetermined number of pre-integration results and a corresponding segment of the PRN code.

The first storage unit (Dual Port SRAM) 320 coupled between the control logic 318 and a control & encoding module 322, as illustrated in FIG. 3, is used to store the partial correlation results and coherent integration results. Coherent integration is an operation that accumulates similar results from individual correlations over a time period to improve the signal to noise ratio and enhance the ability of the receiver to detect weak signals. Each block integrator may perform coherent integrations within a predetermined data length.

A control & encoding module 322 coupled between the first storage unit 320 and a second storage unit 324 is adapted to process the results of coherent integration from the first storage unit 320 and send the processed results to the second storage unit 324. The control & encoding module 322 may perform the following operations: encoding the coherent integration results and further processing the signals, and performing non-coherent integration that is used to increase the signal strength in case of a weak signal.

Figure 4:
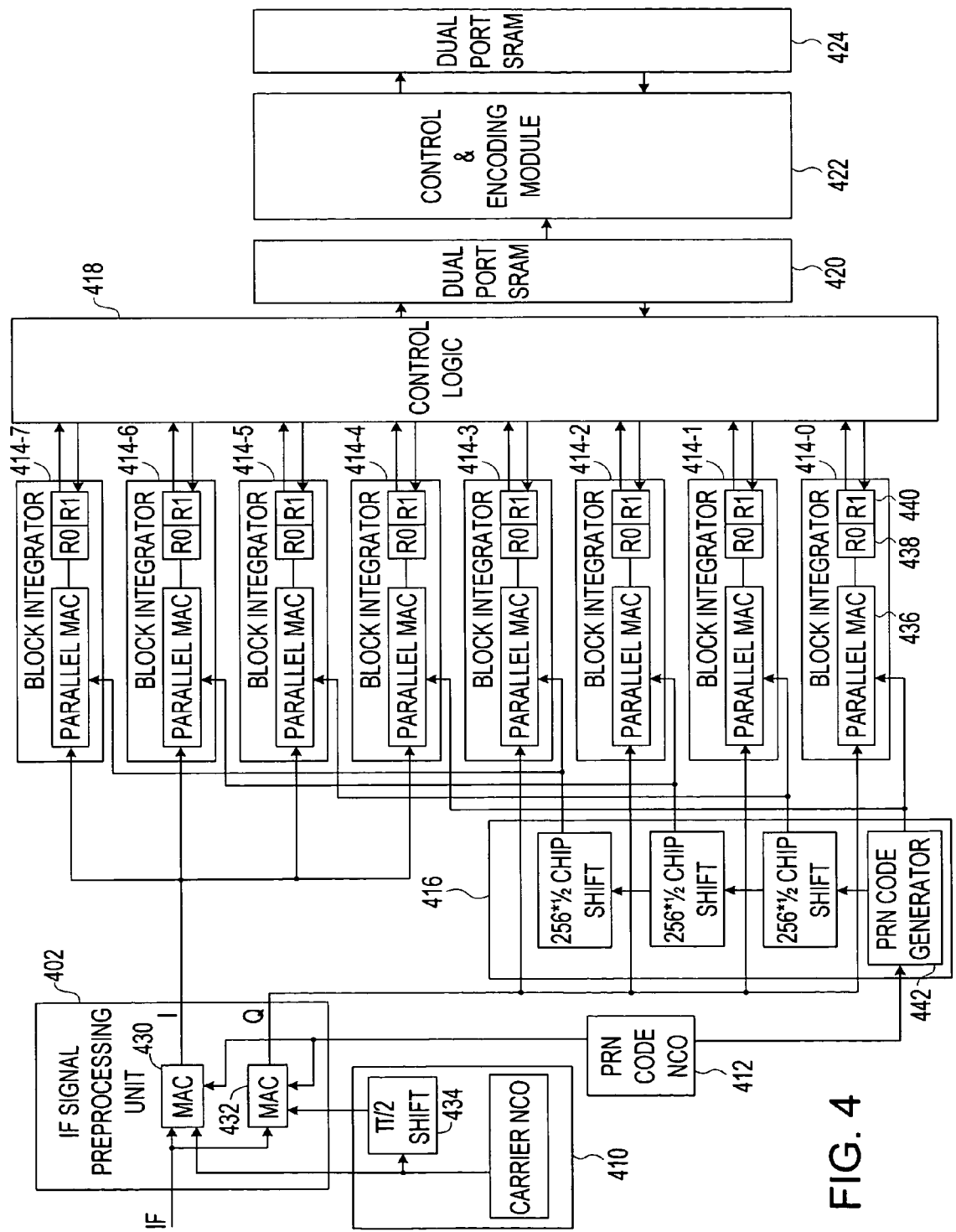
FIG. 4 a detailed exemplary block diagram of the acquisition module of FIG. 3.

FIG. 4 illustrates a detailed architecture of the acquisition module of FIG. 3 taking in-phase (I) signal and quadrature (Q) signal into consideration. A signal generator 410 is capable of generating two orthogonal carrier signals: a sinusoidal signal and a cosinoidal signal. The cosinoidal signal is obtained by shifting the sinusoidal signal. The shifting operation is performed by a $\pi/2$ phase shift module 434. The IF signal preprocessing unit 402 comprises two parallel multiply-accumulator (MAC) units 430 and 432. The first multiply-accumulator(MAC) unit 430 is adapted to perform pre-integrations based upon the sinusoidal signal and the input IF signal and to produce pre-integration results with an in-phase component. The second multiply-accumulator (MAC) unit 432 is adapted to perform pre-integrations based upon the cosinoidal signal and the same input IF signal and to produce pre-integration results with a quadrature component. Each MAC also receives a clock signal generated by a code clock generator (a PRN code NCO) 412 such that the MACs 430, 432 may generate a pre-integration result at twice of the PRN chip code rate (i.e., at the rate of half a chip).

Taking I and Q signals into consideration, two sets of block integrators are used to process I and Q signals respectively. Block integrators 414-4, 414-5, 414-6, and 414-7 may handle the I channel signal and complete a total of 1023 correlations with each block integrator performing 256 correlations, while block integrators 414-0, 414-1, 414-2, and 414-3 handle the Q channel signal and complete 1023 correlations with each block integrator performing 256 correlations. For either I channel or Q channel, since each block integrator operates substantially the same way except that the C/A code sent to each block integrator has a 256*(½ code shift).

The following is a description based on one block integrator. The block integrator 414-0 receives a set of a predetermined number of pre-integration results (e.g. 33 pre-integration results) and a segment of the C/A code containing 33 half chips. A parallel multiply-accumulator (parallel MAC) unit 436 in the block integrator 414-0 is capable of calculating an inner product (also referred to as partial correlation) between 33 pre-integration results and 33 half C/A code chips in a clock cycle (the reciprocal of correlation frequency) and also capable of adding the partial correlation results to a previous partial correlation result. The previous partial correlation result is the inner product produced between previous 33 pre-integration results and 33 respective half C/A code chips with a code phase difference of (256+33) *½ chip with the current C/A code. The clock frequency may be the same as the sampling frequency, e.g., 16.368 MHz or higher, as stated before. The calculation of the inner product is also referred to as the partial correlation because each of the two inputs is a portion of a signal period. The "parallel multiply-accumulator" used herein refers to a MAC that is capable of performing multiplications in parallel and summing up these multiplication results at a time and also capable of accumulating the partial correlation results. The block integrator 414-0 also includes at least two storage registers R0 438 and R1 440 coupled between the parallel MAC unit 436 and a control logic 418. Advantageously, the two storage registers may work in a pipeline mode to alternately store the previous partial correlation result from the storage unit 420 and the current partial correlation result from the parallel MAC unit 436. The operation of the two storage registers is controlled by the control logic 418.

After a partial correlation result is generated, the code generator 416 will shift the C/A code by half a chip. After the C/A code is shifted by half a chip, the block integrator 414-0 starts a next partial correlation taking the same 33 pre-integration results and the shifted C/A code as inputs and adding the current partial correlation result to the corresponding previous correlation result. The block integrator 414-0 repeats the above-mentioned step until next set of 33 pre-integration results are received. Since the time interval between the arrival of two consecutive sets of 33 pre-integration results is 264 clock cycles, which is 33*8, for a fixed 33 pre-integration results, each block integrator will have enough time to compute 256 partial correlations. The block integrator 414-0 keeps receiving sets of 33 pre-integration results in succession until 256 full correlations have been achieved.

256 correlations are conducted in one block integrator in a time division manner such that the 256 correlations are able to share one parallel MAC unit. As a result, a block integrator may be regarded as being equivalent to 256 correlators, thereby decreasing the need for large logic resources. Additionally, the computation of multiplication in correlation calculation by the parallel MAC unit is a simple symbolic calculation because there are only two states of the C/A code: +1 and −1. It should be noted that these advantages can be attributed to the pre-integration process performed by the IF signal pre-integration unit 402 and the packing of these pre-integration results into a plurality of blocks by the IF signal pre-integration unit 402.

A code generator 416 includes a PRN code generator 442 capable of generating parallel C/A code at a rate that is twice of the C/A code chip rate. The generation rate is controlled by a clock signal produced by the PRN code NCO 412. Each C/A code sent to a different block integrator of I or Q channel has a different starting point. However, the block integrator of I channel and its counterpart of Q channel receive the C/A code with the same code phase. For instance, block integrators 414-0 and 414-4 receive the same C/A code with no phase shift. Block integrator 414-1 and 414-5 receive the same C/A code with 256*(½ chip shift). Block integrator 414-2 and 414-6 receive the same C/A code with 2*256*(½ chip shift). Block integrator 414-3 and 414-7 receive the same C/A code with 3*256*(½ chip shift).

The control logic 418 and a first storage unit (a dual port SRAM) 420, a control & encoding module 422 and a second storage unit (a dual port SRAM) 424 in FIG. 4 are similar to those of FIG. 3. Hence, any repetitive description of such components is omitted herein for clarity.

Figure 5:
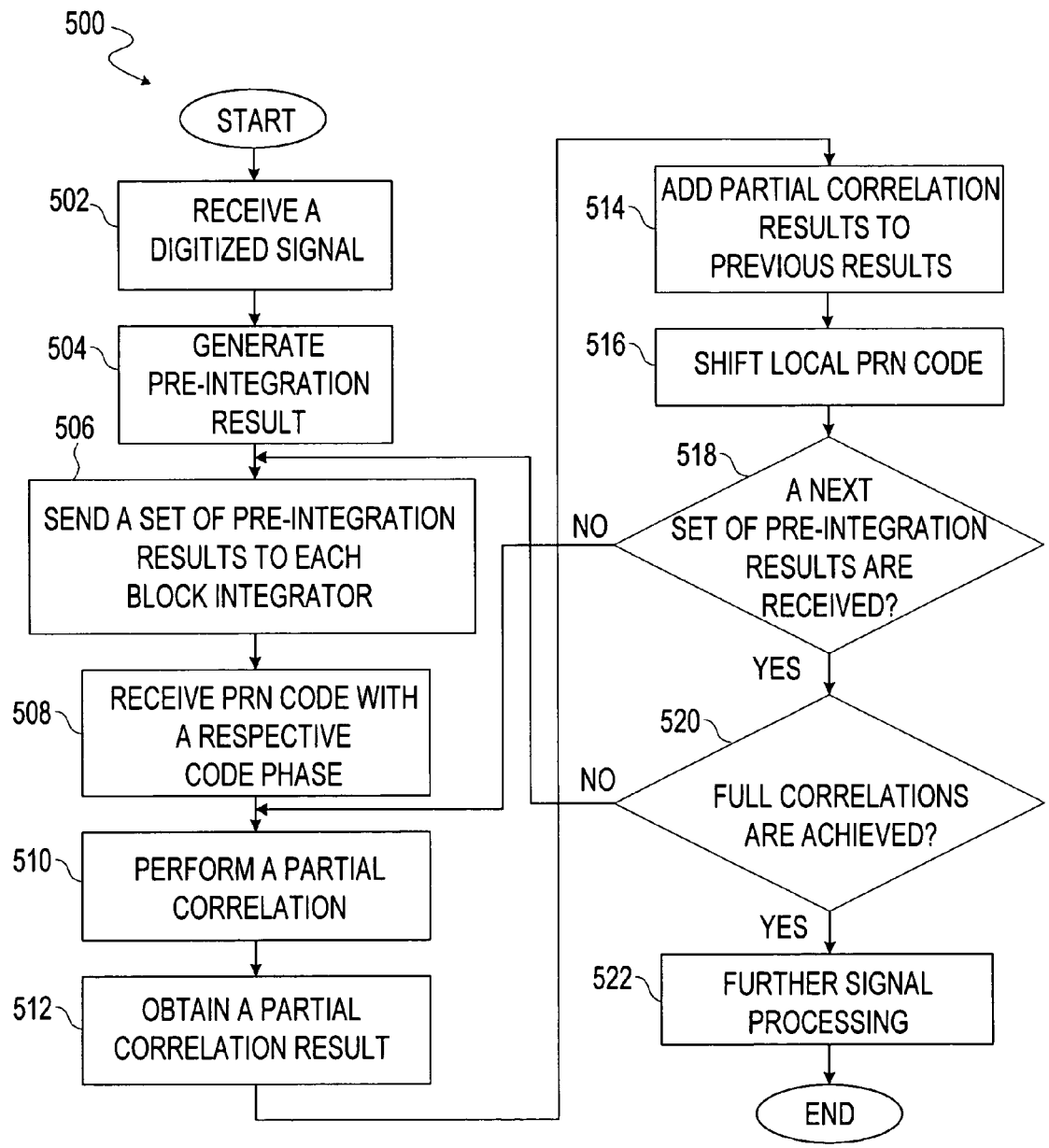
FIG. 5 is an exemplary flowchart for processing spread spectrum signals according to one embodiment of the invention.

FIG. 5 illustrates a flowchart 500 for processing spread spectrum signal in a circuit with a plurality of block integrators, wherein the circuit utilizing an input signal digitized at a predetermined sampling frequency, a local reference signal and a pseudorandom noise code. After the IF signal preprocessing unit receives a digitized signal, step 502, the IF signal preprocessing unit generates pre-integration results based upon the received signal and the local reference signal at a predetermined rate (e.g. twice the PRN code chip rate), step 504. While generating the pre-integration results, the IF signal preprocessing unit sends a set of a predetermined number (e.g. 33) of the pre-integration results to each block integrator, step 506. When each block integrator receives the set of the predetermined number of the pre-integration results, each block integrator also receives a pseudorandom noise code with a respective code phase, step 508. Each block integrator simultaneously takes a segment of the received pseudorandom noise code and the set of the predetermined number (e.g. 33) of the pre-integration results as inputs to perform a partial correlation, step 510. After the partial correlation result is obtained in each block integrator from the partial correlation, step 512, the partial correlation result is added to a previous partial correlation result, step 514, wherein the previous partial correlation result is obtained based upon a previous set of predetermined number of the pre-integration results and a corresponding segment of the pseudorandom noise code. After each block integrator completed a partial correlation, the pseudorandom noise code sent to each block integrator is shifted by a predetermined position, step 516. After the pseudorandom noise code is shifted, it is checked if a next set of the predetermined number of pre-integration results is received at each block integrator, step 518. If a next set of the predetermined number of pre-integration results is not received at each block integrator, the process repeats step 510 through step 516, otherwise the process checks if a plurality of full correlations is achieved in each block integrator, step 520. If a plurality of full correlations is not achieved in each block integrator, the process repeats step 506 through step 518, otherwise the full correlation results are used for further signal processing, step 522.

In operation, the GPS signal is received by an antenna 102 connected to a receiver 100, and converted from its original frequency to an intermediate frequency by a tuner 104. The intermediate frequency signal is then digitized by an analog-to-digital converter 106 at a predetermined sampling frequency. After being digitized, the digital IF signal is sent to an IF signal preprocessing unit 103. The IF signal preprocessing unit 103 performs pre-integration taking IF signal and a local carrier signal as inputs and produces pre-integration results at a predetermined rate. Sets of a predetermined number of the pre-integration results produced by the IF signal preprocessing unit 103 are received, in succession, by a plurality of parallel block integrators 314. For a set of predetermined number of pre-integration results, each block integrator 314 performs a plurality of partial correlation based on the set of predetermined number of pre-integration results and a plurality of shifted segments of PRN code until a next set of pre-determined number of pre-integration results is received by the block integrator 314. Each block integrator 314 continues to receive sets of predetermined number of pre-integration and accumulate a plurality of partial correlation results until a plurality of full correlation results are obtained. The intermediate calculation results are stored in a first storage unit 320. In order to achieve a plurality of full correlation results in each block integrator 314, a control logic 318 is used to read a previous partial correlation result from the first storage unit 320, add current partial correlation result to the previous partial correlation result, and write the modified previous partial correlation result back into the first storage unit 320. Additionally, coherent integration is also conducted by block integrators 314 to improve the signal to noise ratio. The coherent integration results are sent to a control & encoding module 322 for further processing, such as encoding the coherent integration results, further processing the signals and performing non-coherent integration. A second storage unit 324 is used to store the processed results from the control & encoding module 322.

In the context of FIG. 5, the method may also be implemented, for example, by operating portion(s) of a computing device to execute a sequence of machine-readable instructions. Though the steps are illustrated in sequence, the method may be implemented in difference sequence or as an event driven process. The instructions can reside in various types of signal-bearing or data storage primary, secondary, or tertiary media. The media may comprise, for example, RAM (not shown) accessible by, or residing within, the components of computing device. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method for processing spread spectrum signals in a circuit with a plurality of block integrators, the circuit utilizing an input signal digitized at a predetermined sampling frequency, a local reference signal and a pseudorandom noise code, the method comprising the steps of:
   a) generating pre-integration results based upon the input signal and the local reference signal at a predetermined rate;
   b) sending a set of a predetermined number of the pre-integration results to each block integrator;
   c) receiving at each block integrator the pseudorandom noise code with a respective code phase;
   d) performing at each block integrator a partial correlation based on the set of predetermined number of the pre-integration results and a segment of the pseudorandom noise code;
   e) obtaining a partial correlation result in each block integrator from the partial correlation;
   f) adding the partial correlation result to a previous partial correlation result if the previous is present, wherein the previous partial correlation result is obtained based upon a previous set of predetermined number of the pre-integration results and a corresponding segment of the pseudorandom noise code;
   g) shifting the pseudorandom noise code by a predetermined position;
   h) repeating steps d) through g) until a next set of predetermined number of pre-integration results are sent to each block integrator; and
   i) repeating step b) through h) until a plurality of full correlation results have been achieved in each block integrator, wherein the full correlation results are used for further signal processing,
   wherein step a) further comprising the steps of
   a1) multiplying each data point of the input signal and each respective data point of the local reference signal; and
   a2) summing each multiplication result to produce a pre-integration result within a data length.

2. The method of claim 1, further comprising the steps of: dividing the pre-integration results into in-phase and quadrature components; and
separately performing steps b) through i).

3. The method of claim 1, wherein the partial correlations being performed at least said sampling frequency.

4. The method of claim 1, wherein the partial correlations comprising multiplication and addition, the multiplication being symbolic calculations.

5. The method of claim 1, wherein the input signal is an intermediate frequency signal converted from a spread spectrum signal.

6. The method of claim 1, wherein the local reference signal is local canter signal.

7. The method of claim 1, wherein the pseudorandom noise code is a Coarse/Acquisition code, the Coarse/Acquisition code including 1023 code chips, a repetition of the Coarse/Acquisition code being 1 millisecond.

8. The method of claim 1, wherein the predetermined rate is twice the pseudorandom code chip rate.

9. The method of claim 8, wherein the pseudorandom code chip rate is the Coarse/Acquisition code chip rate.

10. The method of claim 1, wherein the data length being half a pseudorandom code chip length, the data length including a plurality of data points, and the number of the plurality of data points being determined by the predetermined sampling frequency.

11. The method of claim 1, wherein the predetermined position is a phase shift of half a pseudorandom code chip.

12. An apparatus for processing spread spectrum signals digitized at a predetermined sampling frequency, comprising:
an intermediate frequency signal preprocessing unit being capable of generating pre-integration results based on an input signal and local reference signals at a predetermined rate;
a signal generator in communication with the intermediate frequency signal preprocessing unit for generating two orthogonal local reference signals; and
a plurality of parallel block integrators in communication with the intermediate frequency signal preprocessing unit, each block integrator being capable of receiving, in succession, sets of a predetermined number of pre-integration results, and for each set of predetermined number of pre-integration results, each block integrator being capable of performing a plurality of partial correlations based on the set of predetermined number of pre-integration results and a plurality of shifted segments of a pseudorandom noise code until a next set of predetermined number of pre-integration results are sent to the block integrator,
wherein each block integrator further comprising a parallel multiply-accumulator unit for performing the partial correlation based on a set of predetermined number of the pre-integration results and a corresponding segment of pseudorandom noise code,
wherein the intermediate frequency signal preprocessing unit further comprising
a first multiply-accumulator unit for calculating the pre-integration results with in-phase component, the first multiply-accumulator unit being capable of multiplying each data point of the input signal and each respective data point of one of the two orthogonal local reference signal and summing each multiplication result to produce a pre-integration result with in-phase component within a data length, and
a second multiply-accumulator unit for calculating the pre-integration results with guadrature component, the second multiply-accumulator unit being capable of multiplying each data point of the input signal and each respective data point of the other local reference signal and summing each multiplication result with other multiplication results to produce a pre-integration result with guadrature component within the data length.

13. The apparatus of claim 12 further comprising:
a control logic coupled to the plurality of block integrators and a storage unit, wherein the control logic reading a previous partial correlation result from the storage unit, adding current partial correlation result to the previous partial correlation result, and writing the modified previous partial correlation result back into the storage unit.

14. The apparatus of claim 13, wherein each block integrator further comprising at least two storage registers coupled between the parallel multiply-accumulator unit and the control logic, the two storage registers alternately storing the previous partial correlation result from the storage unit and storing the current partial correlation result the operation of the at least two storage registers of each block integrator being controlled by the control logic, the at least two storage registers being coupled in series.

15. The apparatus of claim 13, wherein the storage unit being capable of storing calculation results.

16. The apparatus of claim 13, wherein the previous partial correlation is obtained based upon a previous set of predetermined number of the pre-integration results and a corresponding segment of pseudorandom noise code.

17. The apparatus of claim 12, wherein the data length being half a pseudorandom code chip length, the data length including a plurality of data points, and the number of the plurality of data points being determined by the predetermined sampling frequency.

18. The apparatus of claim 12, wherein the plurality of block integrators being divided into two groups, a first group being capable of receiving the pre-integration results with in-phase component and a second group being capable of receiving the pre-integration results with quadrature component.

19. The apparatus of claim 12, further comprising a code clock generator coupled to the intermediate frequency signal preprocessing unit for controlling the generation of the pre-integration results at the predetermined rate.

20. The apparatus of claim 19, further comprising a code generator coupled to the code clock generator for generating, in parallel, a plurality of pseudorandom noise codes with corresponding code phase and sending each of the pseudorandom noise codes with corresponding code phase to a corresponding block integrator.

21. The apparatus of claim 20, wherein the code generator being capable of shifting the pseudorandom noise code by a predetermined position and for each shift of the pseudorandom noise code, the corresponding block integrator performing one of the plurality of partial correlations based on the set of predetermined number of the pre-integration results and the shifted pseudorandom noise code.

22. The apparatus of claim 21, wherein the predetermined position is a phase shift of half a pseudorandom code chip.

23. The apparatus of claim 12, wherein the input signal is digitized by an analog-to-digital converter at the predetermined sampling frequency.

24. The apparatus of claim 12, wherein the partial correlations being performed at least at said sampling frequency.

25. The apparatus of claim 12, wherein the partial correlations comprising multiplication and addition, the multiplication being symbolic calculation.

26. The apparatus of claim 12, wherein the pseudorandom noise code is a Coarse/Acquisition code, the Coarse/Acquisition code including 1023 code chips, a repetition of the Coarse/Acquisition code being 1 milliseconds.

27. The apparatus of claim 12, wherein the predetermined rate is twice the pseudorandom code chip rate.

28. A receiver for receiving spread spectrum signals, comprising:
- a tuner for converting the received spread spectrum signal from its original frequency to an intermediate frequency;
- an analog-to-digital converter coupled to the tuner for converting the intermediate frequency signal into a digitized input signal at a predetermined sampling frequency;
- a storage unit;
- an apparatus coupled to the analog-to-digital converter for processing the spread spectrum signal, including:
  - an intermediate frequency signal preprocessing unit being capable of generating pre-integration results based on the digitized input signal and local reference signals at a predetermined rate;
  - a plurality of parallel block integrators in communication with the intermediate frequency signal preprocessing unit, each block integrator being capable of receiving, in succession, sets of a predetermined number of pre-integration results, and for each set of predetermined number of pre-integration results, each block integrator being capable of performing a plurality of partial correlations based on the set of predetermined number of pre-integration results and a plurality of shifted segments of a pseudorandom noise code until a next set of predetermined number of pre-integration results are sent to the block integrator; and
  - a control logic coupled to the storage unit and the plurality of block integrators, wherein the control logic reading a previous partial correlation result from the storage unit, adding current partial correlation result to the previous partial correlation result, and writing the modified previous partial correlation result back into the storage unit, wherein each block integrator further including a parallel multiply-accumulator unit for performing the partial correlation based on a set of predetermined number of the pre-integration results and a corresponding segment of pseudorandom noise code, and at least two storage registers coupled between the parallel multiply-accumulator unit and the control logic, the at least two storage registers alternately storing the previous partial correlation result from the storage unit and storing the current partial correlation result, the operation of the at least two storage registers of each block integrator being controlled by the control logic, the at least two storage registers being coupled in series.

29. The receiver of claim 28, wherein the apparatus further comprising a signal generator in communication with the intermediate frequency signal preprocessing unit for generating the two orthogonal local reference signals.

30. The receiver of claim 29, wherein the intermediate frequency signal preprocessing unit further comprising:
- a first multiply-accumulator unit for calculating the pre-integration results with in-phase component, the first multiply-accumulator unit being capable of multiplying each data point of the digitized input signal and each respective data point of one of the two orthogonal local reference signal and summing each multiplication result with other multiplication results to produce a pre-integration result with in-phase component within a data length; and
- a second multiply-accumulator unit for calculating the pre-integration results with quadrature component, the second multiply-accumulator unit being capable of multiplying each data point of the digitized input signal and each respective data point of the other local reference signal and summing each multiplication result with other multiplication results to produce a pre-integration result with quadrature component within the data length.

31. The receiver of claim 30, wherein the data length being half a pseudorandom code chip length, the data length including a plurality of data points, and the number of the plurality of data points being determined by the predetermined sampling frequency.

32. The receiver of claim 30, wherein the plurality of block integrators being divided into two groups, a first group being capable of receiving the pre-integration results with in-phase component and a second group being capable of receiving the pre-integration results with quadrature component.

33. The receiver of claim 28, wherein the apparatus further comprising a code clock generator coupled to the intermediate frequency signal preprocessing unit for controlling the generation of the pre-integration results at the predetermined rate.

34. The receiver of claim 33, wherein the apparatus further comprising a code generator coupled to the code clock generator for generating, in parallel, a plurality of pseudorandom noise codes with corresponding code phase and sending each of the pseudorandom noise codes with corresponding code phase to a corresponding block integrator.

35. The receiver of claim 34, wherein the code generator being capable of shifting the pseudorandom noise code by a predetermined position and for each shift of the pseudorandom noise code, the corresponding block integrator performing one of the plurality of partial correlations based on the predetermined number of the pre-integration results and the shifted pseudorandom noise code.

36. The receiver of claim 35, wherein the predetermined position Is a phase shift of halt a pseudorandom code chip.

37. The receiver of claim 28, wherein the partial correlations being performed at least at said sampling frequency.

38. The receiver of claim 28, wherein the partial correlations comprising multiplication and addition, the multiplication being symbolic calculation.

39. The receiver of claim 28, wherein the pseudorandom noise code is a Coarse/Acquisition code, the Coarse/Acquisition code including 1023 code chips, a repetition of the Coarse/Acquisition code being 1 ms.

40. The receiver of claim 28, wherein the predetermined rate is twice the pseudorandom code chip rate.

41. The receiver of claim 28, wherein the previous partial correlation is obtained based upon a previous set of predetermined number of the pre-integration results and a corresponding segment of pseudorandom noise code.

* * * * *